(12) United States Patent
Tang et al.

(10) Patent No.: US 7,860,347 B2
(45) Date of Patent: *Dec. 28, 2010

(54) IMAGE-BASED FACE SEARCH

(75) Inventors: Xiaoou Tang, Beijing (CN); Qiong Yang, Beijing (CN); David P. Vronay, Beijing (CN); Leizhong Zhang, Beijing (CN); Ta Bao, Beijing (CN)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/699,274

(22) Filed: Feb. 3, 2010

(65) Prior Publication Data

US 2010/0135584 A1 Jun. 3, 2010

Related U.S. Application Data

(63) Continuation of application No. 11/466,750, filed on Aug. 23, 2006, now Pat. No. 7,684,651.

(51) Int. Cl.
G06K 9/54 (2006.01)
(52) U.S. Cl. .................... 382/305; 382/115; 382/118; 382/128
(58) Field of Classification Search ................ 382/305, 382/115, 118, 128
See application file for complete search history.

(56) References Cited

U.S. PATENT DOCUMENTS

| | | | |
|---|---|---|---|
| 6,035,055 A | 3/2000 | Wang et al. | |
| 6,430,307 B1 | 8/2002 | Souma et al. | |
| 7,024,033 B2 | 4/2006 | Li et al. | |
| 7,519,200 B2 * | 4/2009 | Gokturk et al. | 382/118 |
| 2003/0169908 A1 | 9/2003 | Kim et al. | |
| 2004/0015495 A1 | 1/2004 | Kim et al. | |
| 2004/0170305 A1 | 9/2004 | Kim et al. | |
| 2005/0190953 A1 | 9/2005 | Nagahashi et al. | |
| 2005/0276483 A1 | 12/2005 | Miyake | |
| 2006/0018522 A1 | 1/2006 | Sunzeri et al. | |

FOREIGN PATENT DOCUMENTS

IE 20050239 A2 2/2006

OTHER PUBLICATIONS

"AltaVista Image Search", Overture Services, Inc., website: http://www.altavista.com/image/, printed on: Aug. 3, 2006, 1 page.

(Continued)

*Primary Examiner*—Matthew C Bella
*Assistant Examiner*—Mike Rahmjoo
(74) *Attorney, Agent, or Firm*—Lee & Hayes, PLLC

(57) ABSTRACT

A search includes comparing a query image provided by a user to a plurality of stored images of faces stored in a stored image database, and determining a similarity of the query image to the plurality of stored images. One or more resultant images of faces, selected from among the stored images, are displayed to the user based on the determined similarity of the stored images to the query image provided by the user. The resultant images are displayed based at least in part on one or more facial features.

16 Claims, 6 Drawing Sheets

OTHER PUBLICATIONS

Baker E., "The Mug-Shot Search Problem: A Study of the Eigenface Metric, Search Strategies, and Interfaces in a System for Searching Facial Image Data", Harvard University Division of Engineering and Applied Sciences, Technical Report TR-16-98, 1999, website: http://people.deas.harvard.edu/users/students/Ellen_Baker/papers.html, printed on: Aug. 3, 2006, 2 pages.

"Image retrieval using regions", Blobworld, website: http://elib.cs.berkeley.edu/blobworld/, printed on: Aug. 3, 2006, 1 page.

Bronstein, et al., "Expression-Invariant 3D Face Recognition", AVBPA 2003, LNCS 2688, pp. 62-70.

"comScore Networks—a Global Internet Information Provider", comScore Networks, Inc., website: http://www.comscore.com/, printed on: Aug. 3, 2006, 1 page.

Eakins, et al., "Content-based Image Retrieval, A Report to the JISC Technology Applications Programme," Institute for Image Data Research, University of Northumbria at Newcastle, Oct. 1999, pp. 1-66, at http://www.unn.ac.uk/iidr/report.html.

Fiore, et al., "Online Personals: An Overview," ACM, CHI 2004, Apr. 24-29, 2004, 4 pages.

Google Image Search, website: http://images.google.com/, printed on Aug. 3, 2006, 1 page.

Huang, et al., "Image Indexing Using Color Correlograms, " in IEEE Conf. on CVPR, 1997, p. 762.

ImgSeek, website: www.imgseek.net, printed on Aug. 23, 2006, 3 pages.

Liu, et al., "A Gabor Feature Classifier for Face Recognition," 2001 IEEE, pp. 270-275.

Martinez, "Face Image Retrieval Using HMMs," 5 pages, available at least as early as Aug. 23, 2006.

Martinez, et al., "The AR Face Database," in CVC Technical Report #24, 1998, pp. 1-6, at http://rvll.ecn.purdue.edu/~aleix/aleix_face_DB.html.

Match.comChina, website: http://cn.match.com/match/mt.cfm?pg=home, printed on: Aug. 3, 2006, 1 page.

Match.com—Find Singles at the World's Largest Online Dating Personals Service, website: http://www.match.com/indexpages/indexalt1.aspx, printed on: Aug. 3, 2006, 1 page.

Messer, et al., "XM2VTSDB: The Extended M2VTS Database," in Proc. of Intl. Conf. on Audio and Video-Based Person Authentication, Washington D.C., 1999, pp. 72-77.

Navarrete, et al., "Interactive Face Retrieval using Self-Organizing Maps", Department of Electrical Engineering, Universidad de Chile, 2002, 4 pages.

Neven Vision, http://www.nevenvision.com/news.html, printed on May 2, 2006, 2 pages.

Online Dating & Personals at Date.com, website: http://www.date.com/, printed on: Aug. 3, 2006, 1 page.

Pentland, et al., "Personalizing Smart Environments: Face Recognition for Human Interaction", http://www.media.mit.edu/-pentland, Oct. 8, 1999, 9 pages.

"QBIC-IBM's Query By Image Content", IBM Corporation, website: http://wwwqbic.almaden.ibm.com/, printed on: Aug. 3, 2006, 1 page.

Rauch, et al., "Human Mate Selection: An Exploration of Assortative Mating Preferences", Pennsylvania State University, 2003, pp. 188-221.

Rui, et al., "Image Retrieval: Current Techniques, Promising Directions, and Open Issues", Journal of Visual Communication and Image Representation 10, 1999, pp. 39-62.

Satoh, et al., "Name-it: Naming and Detecting Faces in News Videos," in IEEE Multimedia, 6(1), (1999) p. 22-35, at http://www.cs.bilkent.edu.tr/~duygulu/Courses/CS554/Spring2004/Presentations/Nazlilkizler.pdf.

Smola, et al., "A Tutorial on Support Vector Regression," Statistics and Computing, 14, 2004, p. 199-222.

Xiao, et al., "Robust Multi-Pose Face Detection in Images," in IEEE Trans. on CSVT, special on Biometrics, 14 (1), 2004, pp. 31-41.

Yahoo! Personals, website: http://personals.yahoo.com/, printed: Aug. 3, 2006, 2 pages.

Yang, "Research on Appearance-based Statistical Face Recognition," Ph.D thesis at Tsinghua University, Beijing, 2004.

Zhang, et al., "Imlooking: Image-based Face Retrieval in Online Dating Profile Search," CHI 2006, Apr. 22-27, 2006, Montreal, Quebec, Canada, pp. 1-7.

Zhou, et al., "Bayesian Tangent Shape Model: Estimating Shape and Pose Parameters via Bayesian Inference," in Intl. Conf. on CVPR, (1), 2003, p. 109-1.

* cited by examiner

IMAGE-BASED FACE SEARCH

RELATED APPLICATION

This application is a continuation of and claims priority to U.S. patent application Ser. No. 11/466,750 (MS1-3164US), filed on Aug. 23, 2006, the disclosure of which is incorporated by reference herein.

BACKGROUND

Online dating services generally use textual search criteria to identify potential matches. Users of the dating services typically create a profile, including a textual description and one or more pictures of the user. Users can search for potential dates by searching the textual description portion of the other users' profiles. Text searching works well to search based on non-visual attributes (such as age, gender, ethnicity, and location of the user), but often falls short when searching based on physical appearance, including facial features. This is troublesome since physical appearance is generally considered one of the most important search criteria among users of online dating services. Text searching also suffers from the fact that users may misrepresent themselves in text, providing inaccurate descriptions of themselves. It is difficult to correct for these inaccuracies, since this behavior can vary across individuals, ages, and cultures.

Image-based searching has been used in other applications, such as facial-recognition, to ease the challenge of textually describing physical attributes. In such applications, images of faces are used as a query to search for other images of the same individual (i.e., the same person depicted in the image used as the query), but not other similar-looking individuals. Such applications typically do not allow users to search based on preferred facial features of the query image.

SUMMARY

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

In view of the above, this disclosure describes a similar person search, which is at least partially image-based. The image-based search eases the challenge of textually describing physical attributes. The search includes comparing a query image provided by the user to a plurality of stored images of faces stored in a stored image database, and determining a similarity of the query image to the plurality of stored images. One or more resultant images of faces, selected from among the stored images, are displayed to the user based on the determined similarity of the stored images to the query image. The resultant images are displayed based at least in part on one or more facial features.

BRIEF DESCRIPTION OF THE DRAWINGS

In the figures, the left-most digit of a reference number identifies the figure in which the designated component or act first appears.

DETAILED DESCRIPTION

Overview

This disclosure is directed to image-based searching, and is shown and described in the context of an image-based face search for an online dating service. Traditional image retrieval techniques, such as those used in facial-recognition, cannot readily be applied to image-based face retrieval for online dating, since those conventional techniques typically focus on searching for a specific person (i.e., the same person depicted in the image used as the query), not other similar-looking individuals as desired in the online dating arena. Also, traditional image retrieval applications are not concerned with how to evaluate similarities between two persons' faces, and how to understand what people perceive and evaluate when viewing similar faces. The image-based search described herein allows users to search profiles using a desired reference or "query" image. This image based search may be implemented as an alternative to the textual queries used on most online dating sites, or may be combined with such textual queries to provide an augmented image-based face retrieval filter.

In one aspect, the image-based search system learns how people perceive similar faces from a user similarity study, and thus involves the evaluation of human perception into the similarity analysis process.

In another aspect, the user may indicate a preference for one or more facial features, such as eyes, nose, mouth, face shape, hair, eyebrows, ears, chin, cheeks, or any other perceptible facial features. The system can compare the query image to a plurality of stored images, taking into account any facial feature preferences identified by the user, and return one or more resulting images similar to the query image. In some implementations, these results may be categorized based the designated preferred facial features, if any.

The image-based search described herein is not limited to online dating services, however, and applies to other contexts and environments. By way of example and not limitation, the image-based search described herein may be employed in social research applications, advertising, social networks, media production, and the like. In one example, the image-based search could be used by fashion, film, and/or television companies to find models or actors that appear similar to a desired query image.

Exemplary Image-Based Search

Figure 1:
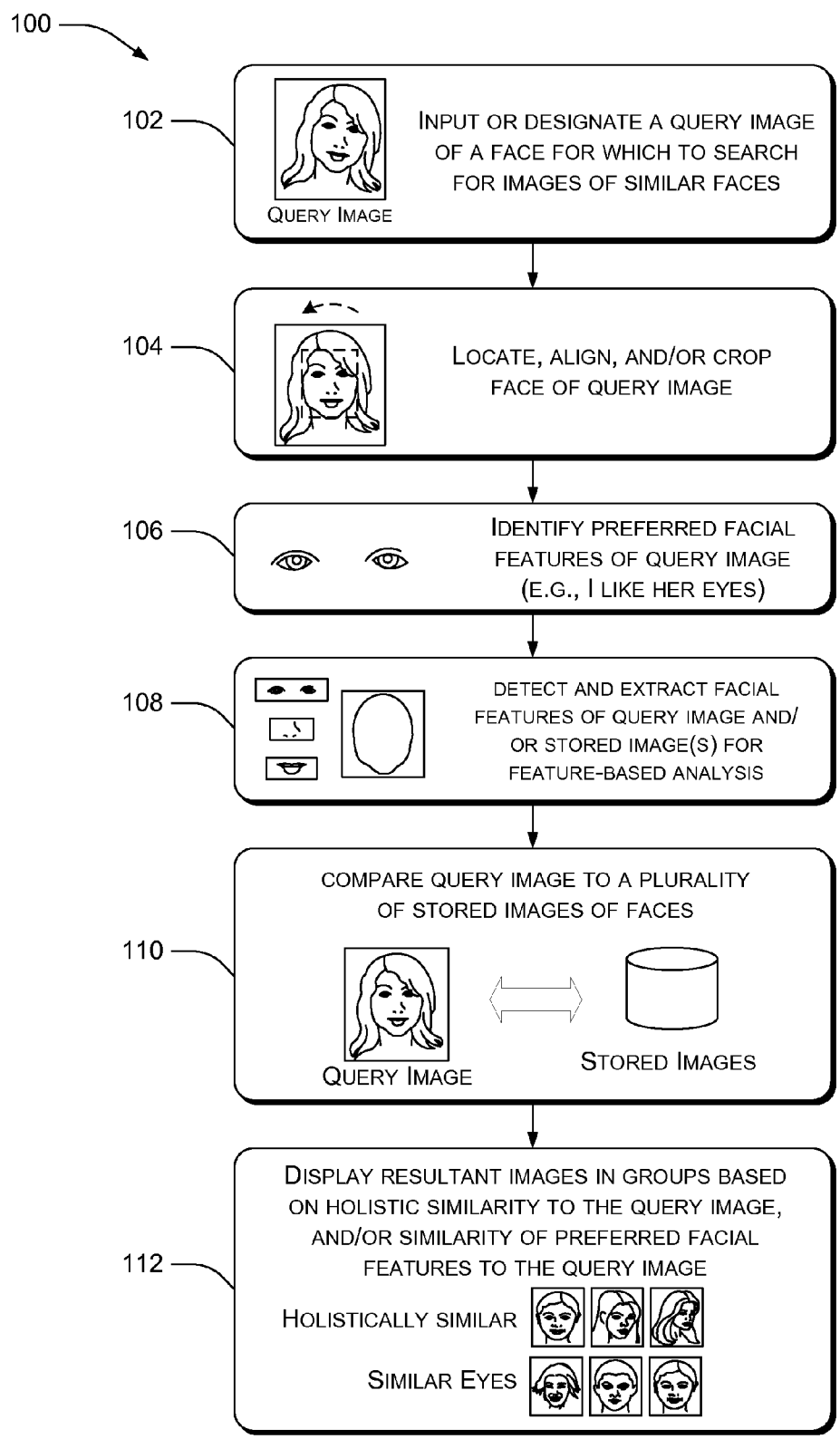
FIG. 1 is a flowchart showing an image-based search according to one exemplary implementation.

FIG. 1 is a flowchart showing an image-based search 100 according to one exemplary implementation, which is broadly applicable to any situation in which it is desired to search for images of faces similar to one or more query images of faces. At 102, a user enters a search query. To search for images of faces similar to a query image, a user provides a copy of the query image. The query image may be provided by inputting a query image (e.g., from a digital camera, scanner, video camera, camera phone, or other image source), designating a query image from among a plurality of stored images, selecting a query image from the Internet, or by otherwise making available a copy of an image to use as the query image. The search query may also include textual search terms to search, for example, based on age, gender, ethnicity, location, or other information which can readily and accurately be recorded in textual data. Such a text-based search may be performed independently of the image-based search, or may be performed prior to the image-based search to narrow the field of stored images to be searched during the image-based search.

Once a query image has been provided, at 104, the face is located in the query image, and the query image is aligned and cropped, if necessary, to isolate the face and to conform the query image to a predetermined standard size, shape, and/or orientation angle. The face may be located using a conventional face detection system such as, for example, the three-step face detector described by Xiao et al. in "Robust Multi-Pose Face Detection in Images," IEEE Trans. on CSTV, special issue on Biometrics, 14(1), p. 31-41, which is incorporated herein by reference. Face alignment and cropping also may be accomplished using any of various well known formatting techniques.

Psychological studies indicate that people perceive human faces using both holistic and feature-based perceptions. Holistic perception treats the human face as a whole, while feature-based perception views the individual facial features (e.g., eyes, nose, mouth, and face shape) separately. Thus, at 106, users are given the opportunity to identify one or more preferred facial features of the face in the query image. For example, the user might indicate that he/she likes the eyes, nose, mouth, face shape, and/or other feature of the face in the query image. The user might indicate his/her preference for the facial features by, for example, marking one feature as being preferred or by assigning a weighted preference to the facial features. However, any other way of indicating a user's preference for one facial feature over another feature may additionally or alternatively be used.

Since humans perceive the face in both holistic and feature-based perceptions, it may be desirable to extract different facial features and conduct similarity analyses based on both holistic and feature-based perception modes. In that case, at 108, features are detected and extracted for feature-based analysis. By way of example, a Bayesian tangent shape model may be used after face detection to locate feature points, such as the control points of the eyes, mouth, nose, and face shape in the query image. Details of using the Bayesian tangent shape model are described by Zhou et al. in "Bayesian Tangent Shape Model: Estimating Shape and Pose Parameters via Bayesian Inference," Intl. Conf. on CVPR, 1, p. 109-111, which is incorporated herein by reference. The query image is then decomposed into a number of parts equal to the number of facial features used (e.g., four parts corresponding to the eye, nose, mouth and face shape, respectively) and texture, size, and shape is extracted for each part. A bank of Gabor filters with multi-scales and multi-orientations is employed to extract texture features in the manner described by Yang in "Research on Appearance-based Statistical Face Recognition," in his PhD thesis at Tsinghua University in Beijing, China, which is incorporated herein by reference. While specific examples of face location and feature extraction techniques are described herein, it should be understood that any other known location and extraction techniques could additionally or alternatively be used.

At 110, the query image is compared to a plurality of stored images of faces. If the initial query included a text-based search, the query image may be compared only to the stored images matching the specified text-based search criteria. For example, if a text-based query specified profiles of female users located in Beijing, China, the query image may be compared only to stored images of females from Beijing. Alternatively, text-based queries, if included, may be conducted independently of the image-based query.

The comparison of the query image to the stored images may be made holistically, based on the faces as a whole, or on an individual facial feature basis. So that the comparison approximates a human's perception of interpersonal similarity, a mapping function is determined based on a survey of one or more human assessors. The survey may be conducted ahead of time (e.g., conducted beforehand based on some pre-prepared data), or may be generated and updated in real-time (e.g., based on evaluations from the users of the image-based search) to adaptively learn the mapping function.

In one example of a survey conducted ahead of time, five assessors were asked to label similarity scores between 2,360 pairs of face images, in five different perception modes: holistic, eyes, nose, mouth, and face shape. The assessors ranked the similarity from 0-3, with 0 being dissimilar and 3 being very similar. The face images were images stored in a stored image database, and included 615 stored images of people of various different ethnicities. Among the people in the stored images, 220 were female and 395 were male. The similarity scoring was independently completed by the assessors. In practice, any number of surveyors and stored images could be used, with larger numbers of surveyors and stored images generally providing a closer approximation to average user perception. The survey may be further enhanced by using surveyors having similar background (e.g., similar age, ethnicity, or the like) to the user performing the search and, therefore, being more likely to have similar preferences.

Once the mapping function is determined, a difference vector is computed between the query image and each of the stored images. Each difference vector is then mapped to a similarity score, which is meant to approximate human perception of similarity. The search results can then be presented based on the similarity scores.

In the example of the survey conducted ahead of time described above, the pair-wise vector differences in the feature space of 2360 different combinations of pairs of the images was computed, and a Support Vector Machine (SVM) with Radial Basis Function (RBF) kernel was used to learn the mapping function for each pair of images in the manner described by Vapnik in "Principles of Risk Minimization for Learning Theory," Advances in Neural Information Processing Systems, 3, p. 831-838, which is incorporated herein by reference. The difference vectors were then mapped to the average score of the five assessors.

The mapping function was then used to calculate the matching score between the query image and each stored image in the stored image database 204 from each of the five perceptions: holistic, eyes, nose, mouth, and face shape. The results for each perception were ranked based on the matching score from high similarity to low. While five different perception modes (i.e., holistic, eyes, nose, mouth, and face shape) are described in the foregoing example, any number of one or more perception modes could alternatively be used. While specific techniques and equipment are described for comparing the query image to the stored images (e.g., computing vector differences, generating mapping functions, and calculating matching scores), any other suitable comparison technique could additionally or alternatively be used.

The search determines one or more stored images that match the specified query, based on a combination of text-based queries, image-based queries, and/or specified feature preference weights. Then, at 112, one or more resultant images found to be similar to the query image are displayed in groups based on the different perception modes. For example, the resultant images may be displayed in groups corresponding to the query image and/or based on similarity to one or more of the eyes, nose, mouth, face shape, or other facial features. Generally, the holistic perception category is displayed at the top if the search results, while the feature-based results (eyes, nose, mouth, and face shape) are displayed in rank order based on the preference weight specified by the user, if any. The displayed results may additionally or alternatively be organized based on results of the text-based query, such as by age, ethnicity, location, or the like. The photo in each result may be auto-framed to highlight the face, and annotated with one or more pieces of profile information as described in more detail below in the section entitled "Exemplary User Interface."

Exemplary Search System

Figure 2:
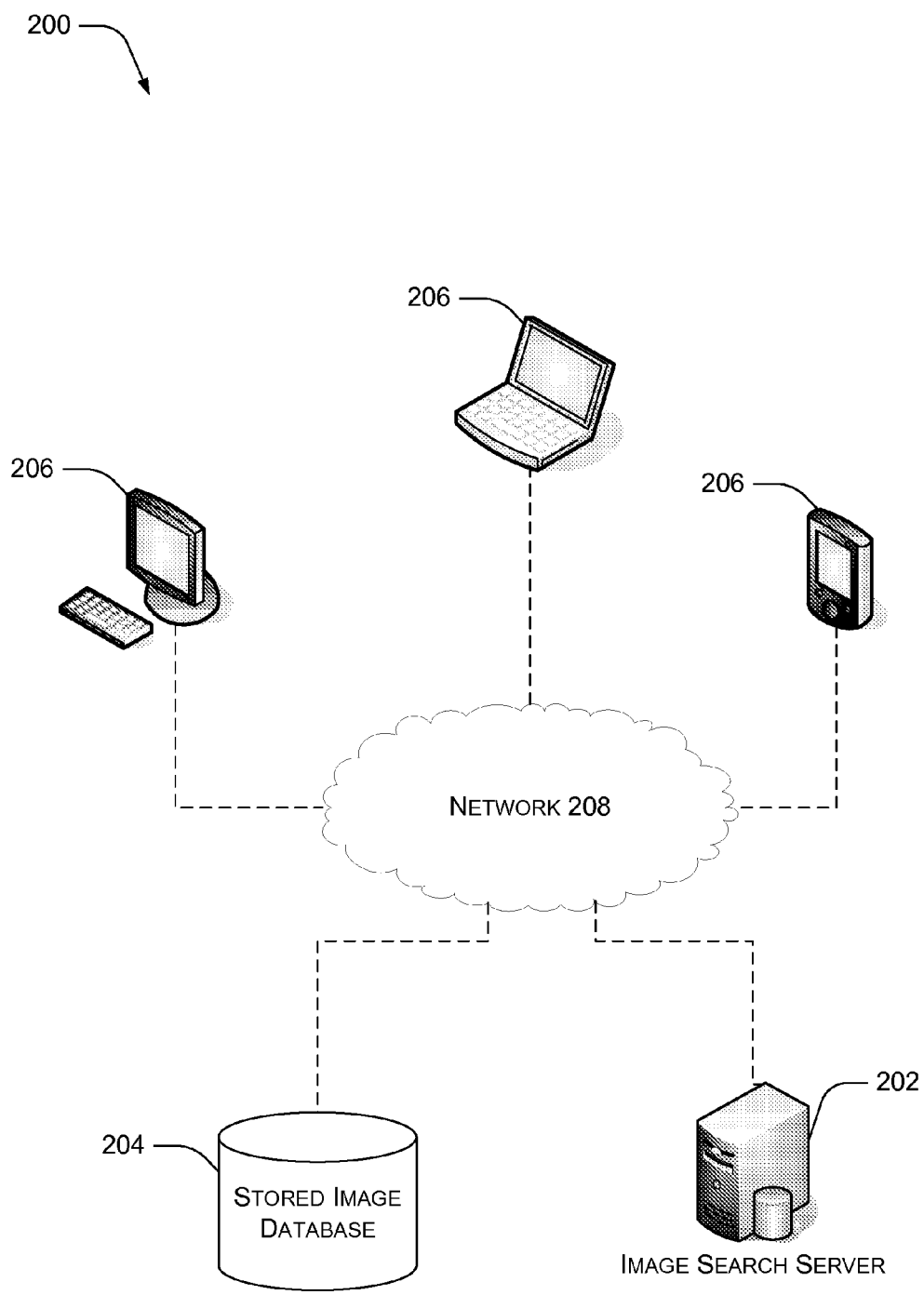
FIG. 2 is a schematic block diagram of an exemplary system for implementing the image-based search of FIG. 1.

FIG. 2 is a schematic block diagram of an exemplary system 200 for implementing an image-based search, such as the one described with reference to FIG. 1. The system comprises an image search server 202 or other computing device, to which are connected one or more stored image databases 204 and various different user terminals 206 via a network 208, such as the Internet. While only one stored image database 204 is shown, stored images may be stored in any number of distributed data stores. Additionally, while the stored image database 204 is shown remotely from the image search server 202, the image database could be at least partially stored locally on the image search server 202. The location of the image storage and computing capacity of the system 200 is not important, and both storage and computing can be suitably distributed among the components of the system 200.

The user terminals 206, image search server 202, and databases 204 may be connected to the network 208 using any conventional wired connection or wireless protocol. Generally, users can access the image-based search using user terminals 206, which may be any sort of computing device, such as a desktop personal computer (PC), a laptop computer, a personal digital assistant (PDA), a smartphone, a pocket PC, or any other mobile or stationary computing device.

Figure 3:
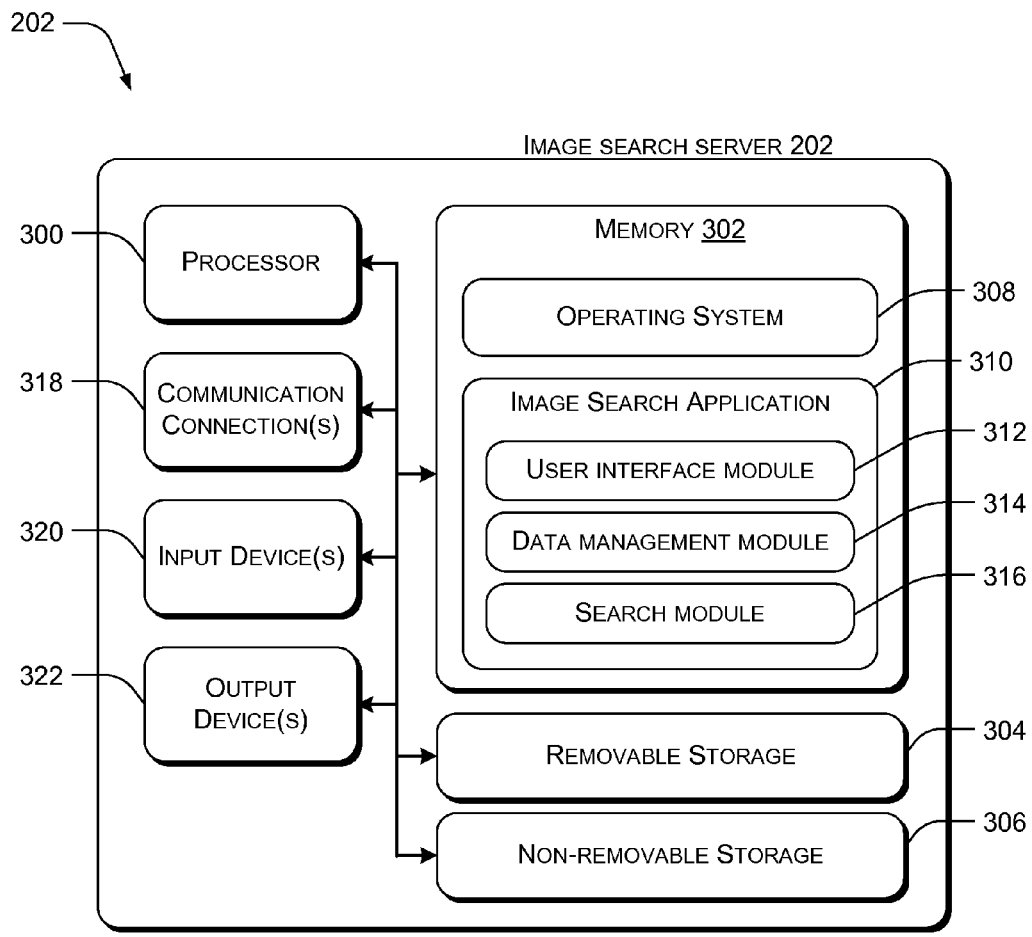
FIG. 3 is a block diagram showing an exemplary image search server of the system of FIG. 2.

FIG. 3 illustrates the image search server 202 of FIG. 2 in more detail. The image search server 202 may be configured as any suitable computing device capable of implementing an image-based search. In one exemplary configuration, the image search server 202 comprises at least one processing unit 300 and memory 302. Depending on the configuration and type of computing device, memory 302 may be volatile (such as RAM) and/or non-volatile (such as ROM, flash memory, etc.). The image search server 202 may also include additional removable storage 304 and/or non-removable storage 306 including, but not limited to, magnetic storage, optical disks, and/or tape storage.

Memory 302 may include an operating system 308, one or more application programs 310-316 for implementing all or a part of the image-based search, as well as various other data, programs, media, and the like. In one implementation, the memory 302 includes an image-search application 310 including a user interface module 312, a data management module 314, and a search module 316. The user interface module 312 presents the user with a graphical user interface for the image-based search, including an interface prompting a user to enter text and/or image profile information, an interface for prompting the user to enter text and/or image-based query information and facial feature preference information, and an interface for displaying search results to the user. The data management module 314 manages storage of information, such as profile information, stored images, and the like, and may communicate with one or more local and/or remote data stores such as stored image database 204. The search module 316 interacts with the user interface module 312 and data storage module 314 to perform search functions, such performing textual searches using conventional text search methodologies, comparing query images to stored images in, for example, the stored image database 204.

Computer storage media includes volatile and nonvolatile, removable and non-removable media implemented in any method or technology for storage of information such as computer readable instructions, data structures, program modules or other data. Memory 302, removable storage 304 and non-removable storage 306 are all examples of computer storage media. Additional types of computer storage media that may be present include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the image search server 202 or other computing device.

The image search server 202 may also contain communications connection(s) 318 that allow the image search server 202 to communicate with the stored image database 204, the user terminals 206, and/or other devices on the network 208. Communications connection(s) 318 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The image search server 202 may also include input device(s) 320 such as a keyboard, mouse, pen, voice input device, touch input device, etc., and output device(s) 322, such as a display, speakers, printer, etc. All these devices are well know in the art and need not be discussed at length here.

Exemplary User Interface

Figure 4:
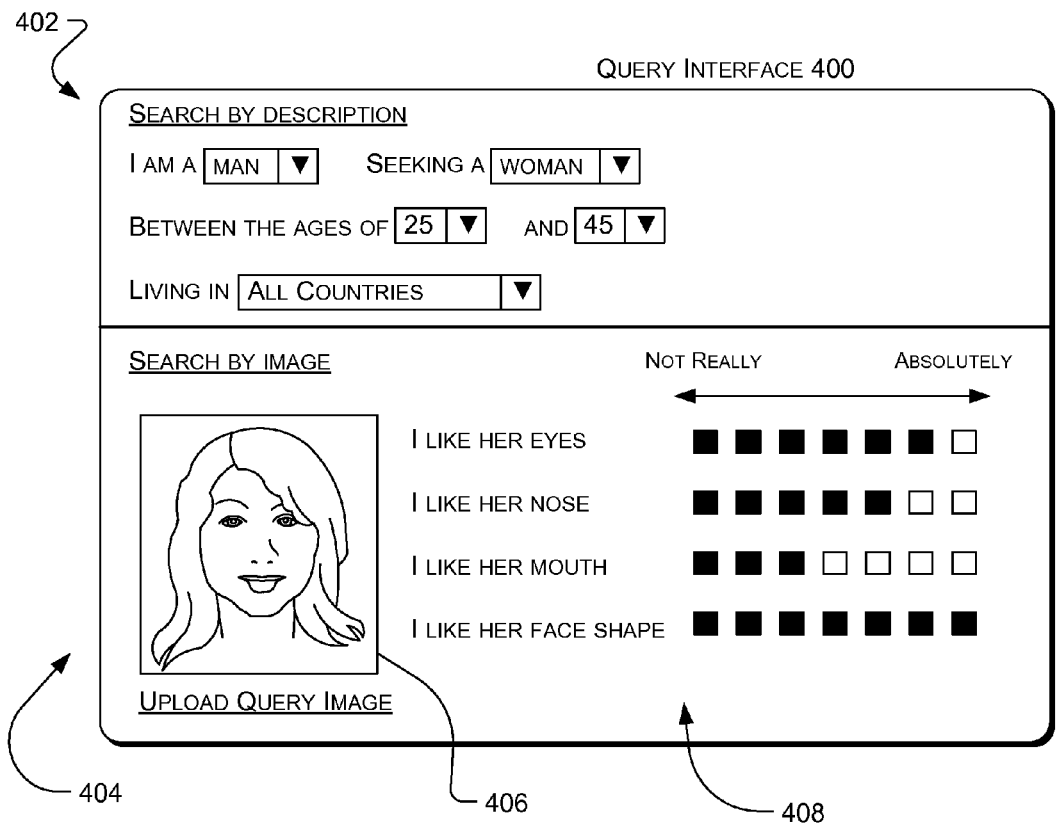
FIG. 4 is a schematic showing an exemplary user interface for entering a query in the image-based search of FIG. 1.
Figure 5:
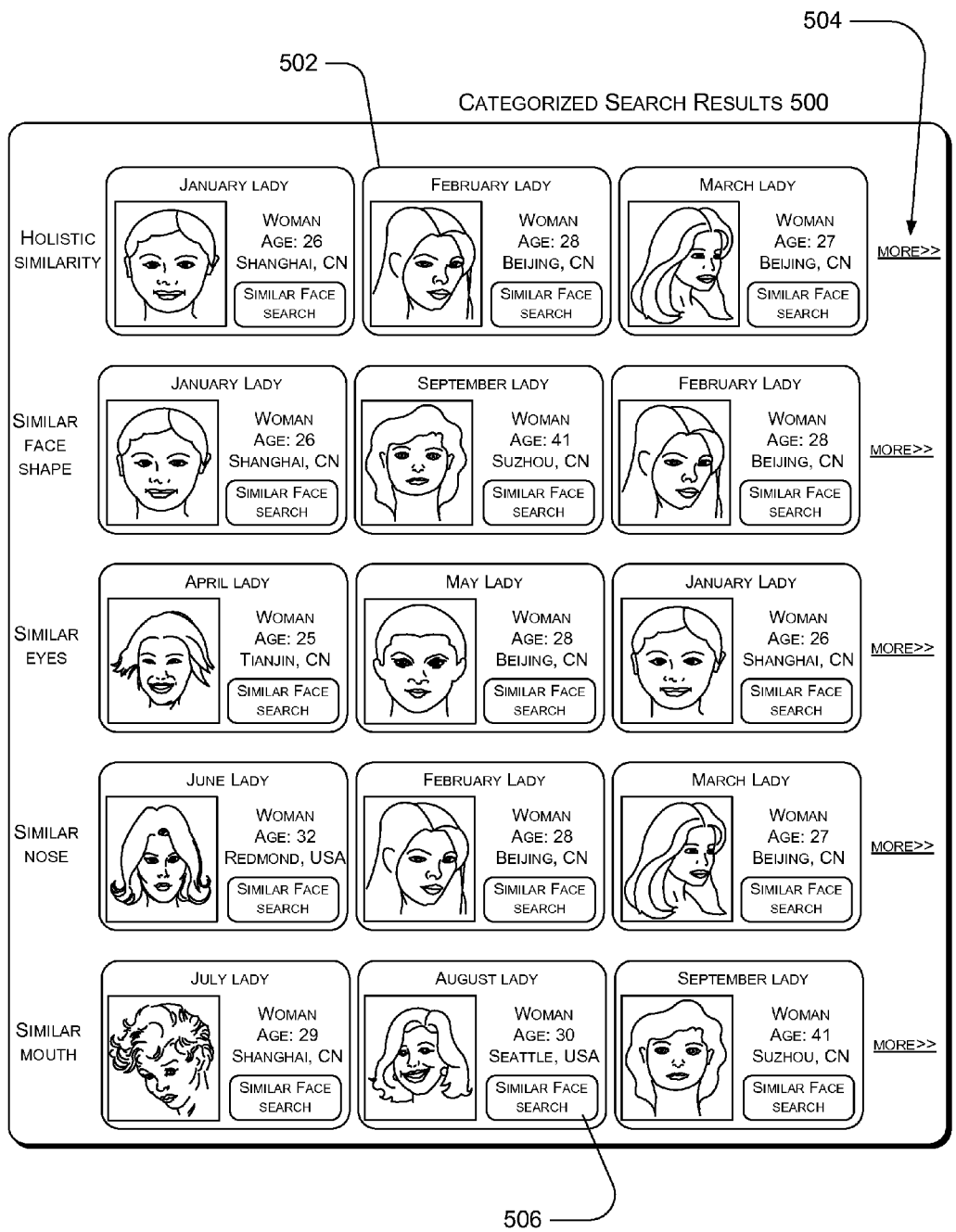
FIG. 5 is a schematic showing an exemplary user interface for displaying search results from the image-based search of FIG. 1.

FIGS. 4 and 5 illustrate an exemplary user interface usable with the image-based search of FIG. 1. FIG. 4 shows a query interface 400, which allows the user to enter query information. Specifically, the query interface 400 includes a text-based portion 402, which allows the user to enter text-based non-visual search criteria, such as gender, age, and location of potential companions to search for. The text-based portion 402 is shown as a structured search form, but could additionally or alternatively include one or more freeform search fields. The text-based portion 402 is provided for its ease and effectiveness at accurately recognizing age, gender, ethnicity, location and other data which is readily recorded in text data. However, in some implementations, the text-based portion 402 of the query interface 400 may be optional or may be omitted entirely.

The query interface 400 also includes an image-based search portion 404, which allows the user to provide a query image 406 to use to search for similar images. The query image may be provided by a user uploading a photo from his or her own collection, by designating a query image from among a plurality of stored images, by selecting a query image from the Internet, and/or by any other manner of making a query image available. In the described implementation, the query image of the face should be a near-frontal view. However, in other implementations, it may be possible to use non-frontal views and/or to generate a frontal view from one or more non-frontal views. The query image may be automatically aligned and cropped to include only the face area. The cropped image may then be displayed in the left part of the image-based search portion 404 of the query interface 400.

Since at least some people have clear preferences for certain facial features, the image-based search portion 404 also may include a feature preference input 408, which allows a user to input a preference for one or more facial features of the query image. In the implementation of FIG. 4, the user may indicate whether and to what degree he or she likes the eyes, nose, mouth, and face shape of the query image on a scale of 1-7, with 1 being the least preferred (marked with the heading "not really") and 7 being the most preferred (marked with the heading "absolutely"). The user may indicate his or her preference by filling the appropriate number of boxes on the scale associated with each of those facial features. For example, in FIG. 4, the user has filled six out of the seven boxes next to the heading "I like her eyes," indicating that he has a strong preference for the eyes of the face in the query image. The user has filled five out of seven boxes next to the heading "I like her nose," three out of seven boxes next to the heading "I like her mouth," and seven out of seven boxes next to the heading "I like her face shape." Other types of feature preference inputs could additionally or alternatively be used, such as selecting a preference number from a drop-down scale, selecting one or more features from a list of features as a preferred feature, or any other manner of allowing a user to indicate a preference for one or more features.

Based on the text- and/or image-based queries input to the query interface 400, the system 200 searches for stored images of users. Categorized search results 500 are displayed to the user, including one or more resultant images 502 and associated profile information (e.g., user name, age, location, etc.) of the user shown in each resultant image 502. In the example shown in FIG. 5, the search results are grouped into five categories: holistic similarity, similar eyes, similar nose, similar mouth, and similar face shape. Each category corresponds to a row of the search results 500, with three resultant images 502 being displayed for each category.

The categories are laid out with the holistic similarity first, followed by the facial features in the order of the preference weight specified by the user on the query interface 400. Thus, because the user in FIG. 4 indicated that he preferred the query image's face shape, eyes, nose, and mouth, in that order of preference, the categories are laid out in that order in the categorized search results 500. However, the results could be displayed in any other configuration or order, and could be categorized into any number of different groups based on facial features, age, ethnicity, location or any other available criteria.

Additional search results may be obtained for each category by selecting a "more>>" link 504 to the right of each row. Also, the user may run a new search using any of the resultant images 502 as the new query image for the search by simply selecting a similar face search button 506 associated with the respective resultant image to be used as the new query image.

Exemplary Search Method

Figure 6:
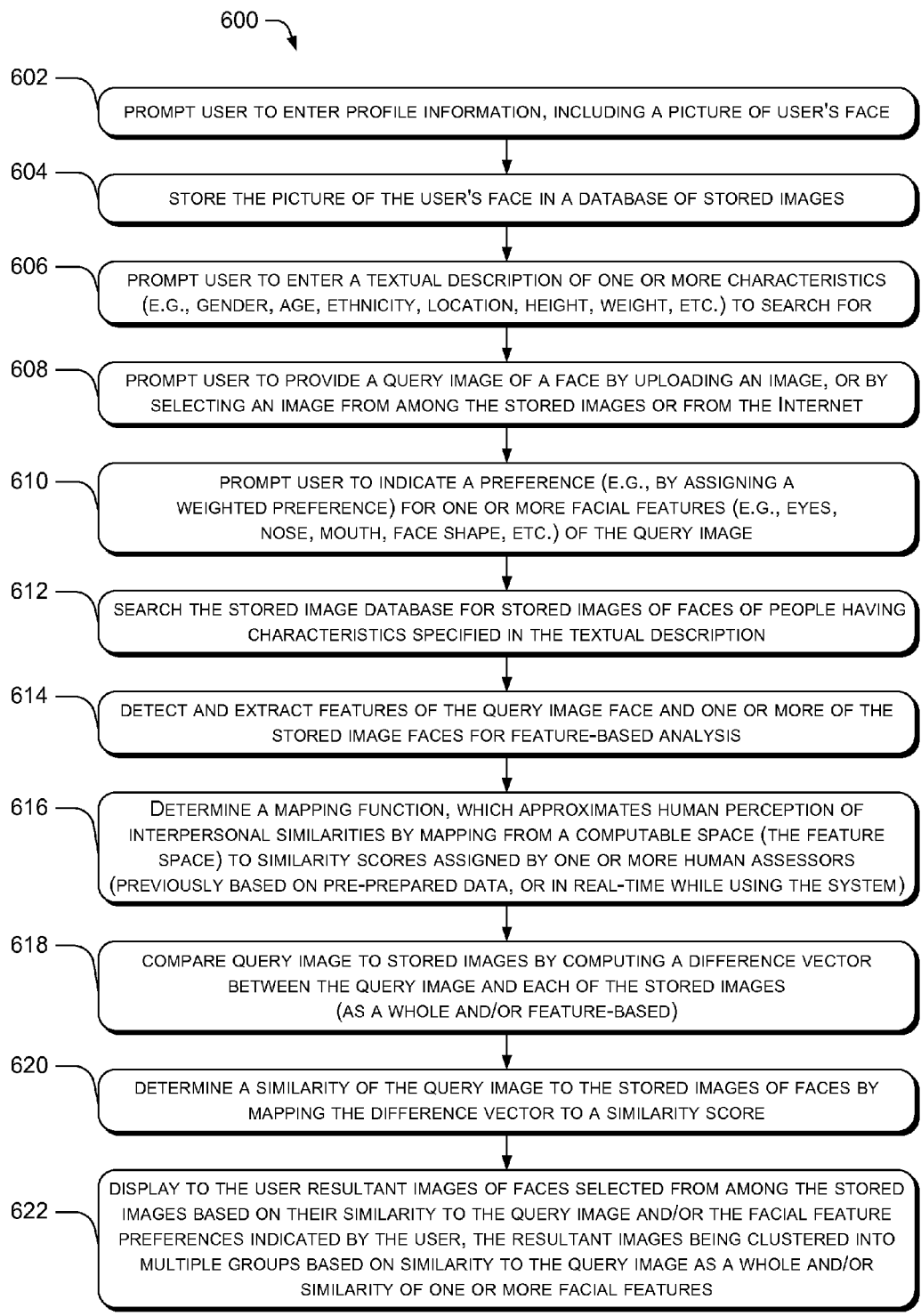
FIG. 6 is a flowchart showing an exemplary image-based search method.

FIG. 6 is a flowchart showing an exemplary image-based search method 600. The method 600 may, but need not, be implemented at least partially by an image-based search system such as that shown in FIG. 2, and may employ a user interface such as that shown in FIGS. 4 and 5. The method 600 comprises, at 602, prompting a user to enter profile information about the user to set up the user's account. The profile information may include textual information including the user's gender, age, ethnicity, and location, as well as one or more pictures of the user. The profile information of the user is then stored, at 604, in one or more databases. In one example, the textual information is stored in one database, while the picture(s) of the user are stored in another database. Alternatively, the textual information and pictures may be stored together in the same database.

At 606, the user is prompted to enter a textual description of one or more characteristics of a person for whom they would like to search. The textual description may be a structured or freeform text search, and may include any characteristic that is readily recordable in textual format. Some examples of information that can readily be recorded in textual format include gender, age, ethnicity, location, height, weight, and the like.

At 608, the user is prompted to provide a query image of a face for which they would like to search for similar faces. The query image may be provided by the user uploading or otherwise inputting an image from the user's own collection, by selecting an image from among the stored images to use as the query image, or by selecting an image from the Internet to use as the query image. The user is then prompted, at 610, to indicate a preference for one or more facial features of the query image. The user's preference may be indicated by assigning a weighted preference value to one or more facial features, such as the eyes, nose, mouth, and face shape of the query image. However, numerous other ways of indicating a preference value may additionally or alternatively be used. Also, any number and type of facial features may be assigned preference values. Additional facial features that could be assigned values include hair, eyebrows, ears, chin, cheeks, or any other perceptible facial features.

At 612, the database of stored images is searched for images of faces corresponding to users having the characteristics specified by the textual search at 606. The subset of stored images matching the textual search may be returned to the user, or the subset of stored images may be used as the field of search for the image-based portion of the search. That is, the textual search could be performed prior to the image-based search to narrow the field of images to search in the image-based search. In that case, at 614, features of the query image face and faces in the subset of stored images are detected and extracted for feature-based analysis. Feature detection and extraction may be performed in any known manner, such as those described in detail above in the section entitled "Exemplary Image-Based Search." At 616, a mapping function is determined, which approximates human perception of interpersonal similarities by mapping from a computable space (the feature space) to similarity scores assigned by one or more human assessors (previously based on pre-prepared data, or in real-time while using the system). As discussed above, the survey may be conducted ahead of time or may be generated and updated in real-time. The mapping function can be generated in any known manner, such as calculating pair-wise difference vectors in the feature space of a plurality of stored images, and learning the mapping function for each pair of images using a SVM machine, as described above, or using any of a variety of other known techniques. The difference vectors can then be mapped to the average score of the human assessors.

Then, at 618, the query image is compared to stored images of faces stored in the stored image database, by computing a difference vector between the query image and each of the stored images (as a whole and/or feature-based). Based on the comparison, at 620, the method determines the similarity of the query image (and/or one more facial features thereof) to the stored images of faces (and/or one or more corresponding facial features thereof) in the stored database by mapping the difference vector to a similarity score.

The search results are displayed to the user at 622. The search results may include one or more resultant images of faces, which are selected from among the stored images based on the determined similarity to the query image (holistic and/or feature-based) and/or based on the facial feature preferences indicated by the user at 610, if any. The resultant images may be categorized and clustered into groups based at least in part on their similarity to the query image as a whole and/or the similarity of one or more facial features to the corresponding feature(s) of the query image.

Specifics of one exemplary search method are described above. However, it should be understood that certain acts in the search method 600 need not be performed in the order described, may be modified, and/or may be omitted entirely, depending on the circumstances. For example, the text-based search may be conducted independently of the image-based search, or may be omitted entirely, if so desired. Also, other methods of comparing the query image to the stored images and/or determining a similarity of the query image to one or more stored images may be used.

Moreover, any of the acts described above may be implemented by a processor or other computing device based on instructions stored on one or more computer-readable media associated with the image-based search system or a component thereof. As discussed above, computer-readable media can be any available media that can be accessed by the image-based search system or a component thereof.

CONCLUSION

Although the subject matter has been described in language specific to structural features and/or methodological acts, the subject matter defined in the appended claims is not necessarily limited to the specific features or acts described. Rather, the specific features and acts are disclosed as exemplary forms of implementing the claims. For example, the methodological acts need not be performed in the order or combinations described herein, and may be performed in any combination of one or more acts.

What is claimed is:

1. One or more computer-readable media storing instructions comprising:
    prompting a user to provide a query image of a face;
    prompting the user to indicate a preference for one or more facial features of the query image of the face;
    comparing the query image provided by the user to a plurality of stored images of faces stored in a stored image database, wherein the comparison of the query image provided by the user to the plurality of stored images of faces stored in the stored image database comprises computing a difference vector between the query image and each of the stored images;
    determining a similarity of the query image provided by the user to the plurality of stored images of faces stored in the stored image database, based on the comparison and a mapping function of the stored images, wherein the mapping function of the stored images is determined based at least in part on similarity scores assigned by one or more human assessors; and
    displaying one or more resultant images of faces to a user, the resultant images being selected from among the stored images based on the determined similarity to the query image provided by the user, and based on the facial feature preferences indicated by the user.

2. The one or more computer-readable media of claim 1, wherein prompting the user to indicate a preference for one or more facial features comprises prompting the user to assign a weighted preference value to the one or more facial features of the query image of the face.

3. The one or more computer-readable media of claim 1, wherein prompting the user to indicate a preference for one or more facial features comprises prompting the user to indicate one or more of the facial features of the query image of the face as being more preferred than one or more other facial features.

4. The one or more computer-readable media of claim 1, wherein prompting the user to indicate a preference for one or more facial features comprises prompting the user to assign a weighted preference value for the eyes, mouth, nose, and/or shape of the face in the query image.

5. The one or more computer-readable media of claim 1, wherein displaying the resultant images comprises clustering the resultant images into multiple groups based on facial features.

6. The one or more computer-readable media of claim 5, wherein the groups into which the resultant images are clustered comprise a holistic group comprising resultant images that as a whole resemble the query image face, and at least one facial feature group comprising resultant images that have a specified facial feature that resembles a corresponding facial feature of the query image face.

7. The one or more computer-readable media of claim 5, wherein the groups into which the resultant images are clustered comprise:
    a holistic group comprising resultant images that as a whole resemble the query image face, an eye facial feature group comprising resultant images of faces having eyes that resemble eyes of the query image face,
    a nose facial feature group comprising resultant images of faces having noses that resemble a nose of the query image face,
    a mouth facial feature group comprising resultant images of faces having mouths that resemble the mouth of the query image face, and/or
    a face shape facial feature group comprising resultant images of face shapes that resemble a face shape of the query image face.

8. The one or more computer-readable media of claim 1, further comprising instructions for:
    prompting the user to enter a textual description of one or more characteristics of a person; and
    searching the database of stored images for stored images of faces corresponding to people having the characteristics specified by the user prior to comparing the query image to the plurality of stored images,
    wherein the plurality of stored images of faces to which the query image is compared comprises only those stored images of faces corresponding to people having the characteristics specified by the user.

9. The one or more computer-readable media of claim 1, further comprising instructions for:
    prompting the user to enter profile information about the user including a picture of the user's face; and storing the picture of the user's face in the stored image database.

10. The one or more computer-readable media of claim 1, wherein the query image may be provided by the user uploading a photograph, or by the user selecting an image from among the stored images.

11. An image-based online dating service at least partially implemented by the one or more computer-readable media of claim 1.

12. A computer-implemented method comprising:
prompting a user to provide a query image of a face through an input device;
prompting the user to indicate a preference for one or more facial features of the query image of the face;
comparing a query image provided by a user to a plurality of stored images of faces stored in a stored image database;
displaying one or more resultant images of faces to a user, the resultant images being selected from among the stored images based on a determined similarity to the query image provided by the user, the determined similarity to the query image being based, at least in part, on the comparison and a mapping function of the stored images, wherein the comparison of the query image provided by the user to the plurality of stored images of faces stored in the stored image database comprises computing a difference vector between the query image and each of the stored images, wherein the mapping function of the stored images is determined based at least in part on similarity scores assigned by one or more human assessors, and wherein the displayed resultant images are clustered into multiple groups based at least in part on one or more facial features.

13. The computer-implemented method of claim 12, wherein the groups into which the resultant images are clustered comprise a holistic group comprising resultant images that as a whole resemble the query image face, and at least one facial feature group comprising resultant images that have a facial feature that resembles a corresponding facial feature of the query image face.

14. The computer-implemented method of claim 12, wherein the groups into which the resultant images are clustered comprise:
a holistic group comprising resultant images that as a whole resemble the query image face, an eye facial feature group comprising resultant images of faces having eyes that resemble eyes of the query image face,
a nose facial feature group comprising resultant images of faces having noses that resemble a nose of the query image face,
a mouth facial feature group comprising resultant images of faces having mouths that resemble the mouth of the query image face, and/or
a face shape facial feature group comprising resultant images of face shapes that resemble a face shape of the query image face.

15. The method of claim 12, further comprising prompting the user to indicate a preference for one or more facial features of the query image of the face, wherein the displayed resultant images are clustered into multiple groups based at least in part on the facial feature preferences indicated by the user.

16. A system for implementing face image matching comprising:
memory and a processor;
a user interface module, stored in the memory and executable on the processor, configured to:
prompt a user to provide a query image of a face; and
prompt the user to indicate a preference for one or more facial features of the query image of the face;
a data management module, stored in the memory and executable on the processor, configured to manage a plurality of stored images of faces stored in a stored image database;
a comparison module, stored in the memory and executable on the processor, configured to compare the query image provided by the user to the plurality of stored images o faces stored in a stored image database, wherein the comparison of the query image provided by the user to the plurality of stored images of faces stored in the stored image database comprises computing a difference vector between the query image and each of the stored images; and
a search module, stored in the memory and executable on the processor, configured to determine a similarity of the query image provided by the user to the plurality of stored images of faces stored in the stored image database, the user interface module being further configured to display one or more resultant images of faces to a user, the resultant images being selected from among the stored images based on the determined similarity to the query image provided by the user, and based on the facial feature preferences indicated by the user, the search module further configured to compare the query image provided by the user to a plurality of stored images of faces stored in a stored image database, wherein the search module determines the similarity of the query image based at least in part on the comparison and a mapping function of the stored images, wherein the mapping function of the stored images is determined at least in part on similarity scores assigned by one or more human assessors.

* * * * *